United States Patent
Lee et al.

(10) Patent No.: US 11,091,674 B2
(45) Date of Patent: Aug. 17, 2021

(54) MULTILAYER ADHESIVE TAPE

(71) Applicant: LG Chem, Ltd., Seoul (KR)

(72) Inventors: Sle Lee, Daejeon (KR); Dong Hoon Lim, Daejeon (KR); Ju Yong Seo, Daejeon (KR); Jun Man Choi, Daejeon (KR); Woo Yeon Kim, Daejeon (KR); Ho Kyung Song, Daejeon (KR); Jae Sung Hong, Daejeon (KR); Jang Soon Kim, Daejeon (KR); Kwang Su Seo, Daejeon (KR)

(73) Assignee: LG Chem, Ltd.

( * ) Notice: Subject to any disclaimer, the term of this patent is extended or adjusted under 35 U.S.C. 154(b) by 36 days.

(21) Appl. No.: 16/500,629

(22) PCT Filed: May 18, 2018

(86) PCT No.: PCT/KR2018/005710
§ 371 (c)(1),
(2) Date: Oct. 3, 2019

(87) PCT Pub. No.: WO2018/216966
PCT Pub. Date: Nov. 29, 2018

(65) Prior Publication Data
US 2020/0095484 A1 Mar. 26, 2020

(30) Foreign Application Priority Data
May 22, 2017 (KR) .................. 10-2017-0062844

(51) Int. Cl.
*C09J 133/08* (2006.01)
*C09J 7/38* (2018.01)
(Continued)

(52) U.S. Cl.
CPC ............... *C09J 133/08* (2013.01); *B32B 7/12* (2013.01); *C09J 7/385* (2018.01);
(Continued)

(58) Field of Classification Search
CPC .. C09J 133/08; C09J 133/064; C09J 133/066; C09J 133/068; C09J 133/26; C09J 7/38;
(Continued)

(56) References Cited

U.S. PATENT DOCUMENTS

| | | |
|---|---|---|
| 2013/0164478 A1 | 6/2013 | Yamamoto et al. |
| 2017/0101552 A1 | 4/2017 | Doe et al. |

FOREIGN PATENT DOCUMENTS

| | | |
|---|---|---|
| JP | 2009013361 A | 1/2009 |
| JP | 2010161167 A | 7/2010 |

(Continued)

OTHER PUBLICATIONS

Extended European Search Report with Written Opinion for Application No. 18805703.8 dated Mar. 20, 2020, 7 pages.
(Continued)

*Primary Examiner* — Ruiyun Zhang
(74) *Attorney, Agent, or Firm* — Lerner, David, Littenberg, Krumholz & Mentlik, LLP

(57) ABSTRACT

A multilayer adhesive tape exhibiting high step coverage and having both high reworkability and excellent punchability is provided. The multilayer adhesive tape sequentially includes: a first outer adhesive layer; an intermediate adhesive layer; and a second outer adhesive layer, in which a glass transition temperature of the intermediate adhesive layer is −40° C. or more and 0° C. or less, a glass transition temperature of each of the first outer adhesive layer and the second outer adhesive layer is −60° C. or more and −20° C. or less, and a difference in glass transition temperature between each of the first outer adhesive layer and the second outer adhesive layer and the intermediate adhesive layer is 5° C. or more and 25° C. or less.

15 Claims, 1 Drawing Sheet

(51) Int. Cl.
*B32B 7/12* (2006.01)
*G02F 1/1333* (2006.01)
(52) U.S. Cl.
CPC ... *G02F 1/133308* (2013.01); *C09J 2203/318* (2013.01); *C09J 2301/208* (2020.08); *C09K 2323/05* (2020.08); *C09K 2323/057* (2020.08); *G02F 2202/28* (2013.01)
(58) Field of Classification Search
CPC .............. C09J 7/385; C09J 2301/208; C09J 2203/318; B32B 7/12; G02F 1/133308; G02F 2202/28; C09K 2323/05; C09K 2323/057
USPC .................. 428/1.5, 1.54, 214, 355 R, 354
See application file for complete search history.

(56) References Cited

FOREIGN PATENT DOCUMENTS

| | | | |
|---|---|---|---|
| JP | 2012167163 A | 9/2012 |
| JP | 2012184390 A | 9/2012 |
| JP | 2012188479 A | 10/2012 |
| JP | 2014145023 A | 8/2014 |
| JP | 2017008205 A | 1/2017 |
| JP | 2017075281 A | 4/2017 |
| KR | 20130039418 A | 4/2013 |
| KR | 20160025050 A | 3/2016 |
| WO | 2014181853 A1 | 11/2014 |

OTHER PUBLICATIONS

Search report from International Application No. PCT/KR2018/005710, dated Aug. 24, 2018.

[Figure 1]
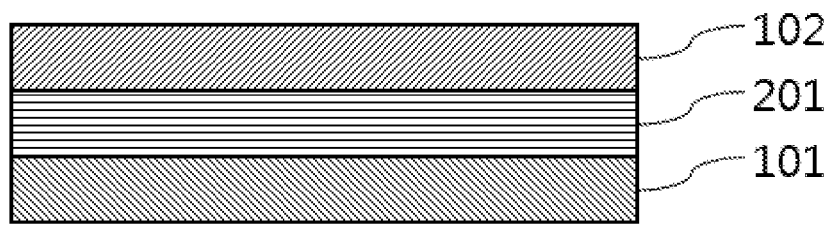
[Figure 2]
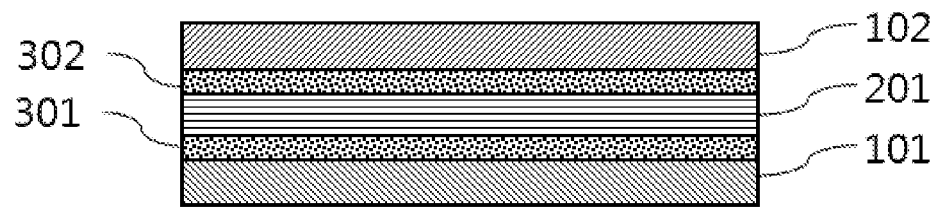

MULTILAYER ADHESIVE TAPE

CROSS-REFERENCE TO RELATED APPLICATIONS

The present application is a national phase entry under 35 U.S.C. § 371 of International Application No. PCT/KR2018/005710 filed May 18, 2018, which claims priority from Korean Application No. 10-2017-0062844 filed May 22, 2017.

TECHNICAL FIELD

A multilayer adhesive tape is provided.

BACKGROUND ART

Various members are attached to an electronic device by an adhesive agent. For example, various optical members such as a polarizing plate, a phase difference plate, an optical compensation film, a reflection sheet, a protection film, and a brightness-enhancing film may be attached to a liquid crystal display (LCD) by an adhesive tape. Recently, as the performance of devices using an adhesive tape has been improved, physical properties required for the adhesive tape have also become gradually tricky. Specifically, excellent durability according to a high temperature fluctuation and semi-permanent adhesive performance have also been required in some cases. Furthermore, reworkability in which the residue does not remain when an adhesive tape is removed for reconstruction has been required in some cases. As described above, there is a need for continuous studies for an adhesive tape suitable for the improved requirements.

REFERENCES OF THE RELATED ART

Patent Document

Korean Patent Application Laid-Open No. KR 10-2016-0025050 A

DETAILED DESCRIPTION OF THE INVENTION

Technical Problem

A multilayer adhesive tape exhibiting high step coverage and having both high reworkability and excellent puchability is provided.

Technical Solution

An exemplary embodiment provides a multilayer adhesive tape sequentially including: a first outer adhesive layer; an intermediate adhesive layer; and a second outer adhesive layer, in which a glass transition temperature of the intermediate adhesive layer is −40° C. or more and 0° C. or less, a glass transition temperature of each of the first outer adhesive layer and the second outer adhesive layer is −60° C. or more and −20° C. or less, and a difference between the glass transition temperature of each of the first outer adhesive layer and the second outer adhesive layer and the glass transition temperature of the intermediate adhesive layer is 5° C. or more and 25° C. or less.

Advantageous Effects

A multilayer adhesive tape according to an exemplary embodiment exhibits high step coverage, and simultaneously has high reworkability. Since the multilayer adhesive tape according to an exemplary embodiment has high punchability, it is possible to minimize errors at the time of cutting the multilayer adhesive tape.

BRIEF DESCRIPTION OF DRAWINGS

FIG. 1 is a schematic view of a lamination structure of a multilayer adhesive tape according to an exemplary embodiment.

FIG. 2 is a schematic view of a lamination structure of a multilayer adhesive tape according to an exemplary embodiment.

BEST MODE

When one member is disposed "on" another member in the present specification, this includes not only a case where the one member is brought into contact with another member, but also a case where still another member is present between the two members.

When one part "includes" one constituent element in the present specification, unless otherwise specifically described, this does not mean that another constituent element is excluded, but means that another constituent element may be further included.

In the present specification, the term "polymerization unit of monomer" means a form in which the monomer forms a skeleton of the polymer, for example, a main chain or a side chain by being subjected to a polymerization reaction.

In the present specification, the unit "parts by weight" means a ratio of the weights between the respective components.

Hereinafter, the present specification will be described in more detail.

An exemplary embodiment provides a multilayer adhesive tape sequentially including: a first outer adhesive layer; an intermediate adhesive layer; and a second outer adhesive layer, in which a glass transition temperature of the intermediate adhesive layer is −40° C. or more and 0° C. or less, a glass transition temperature of each of the first outer adhesive layer and the second outer adhesive layer is −60° C. or more and −20° C. or less, and a difference between the glass transition temperature of each of the first outer adhesive layer and the second outer adhesive layer and the glass transition temperature of the intermediate adhesive layer is 5° C. or more and 25° C. or less.

FIG. 1 is a schematic view of a lamination structure of a multilayer adhesive tape according to an exemplary embodiment. Specifically, FIG. 1 illustrates that a first outer adhesive layer 101, an intermediate adhesive layer 201, and a second outer adhesive layer 102 are sequentially laminated.

In the present specification, the glass transition temperature (Tg) is measured by increasing the temperature at a heating rate of 5° C./min within a temperature range of −70° C. to 100° C. using a differential scanning calorimeter (DSC) (Q-1000, manufactured by TA Instrument Inc.). In this case, the glass transition temperature is decided as the midpoint of the DSC curve.

The glass transition temperature of the intermediate adhesive layer may be higher than the glass transition temperature of each of the first outer adhesive layer and the second outer adhesive layer. Accordingly, the intermediate adhesive layer may have higher tensile force. Since the multilayer adhesive tape includes an intermediate adhesive layer having a relatively high glass transition temperature and high tensile force, there is an advantage in that the multilayer adhesive tape is not cut off well and is easily removed when the multilayer adhesive tape is removed for reconstruction after attaching to an adherend. Specifically, the intermediate adhesive layer may serve to improve reworkability of the multilayer adhesive tape.

Furthermore, the first outer adhesive layer and the second outer adhesive layer have a low glass transition temperature and thus may implement high step coverage. Specifically, the first outer adhesive layer and the second outer adhesive layer may have high fluidity due to a low glass transition temperature. Accordingly, the multilayer adhesive tape may effectively cover a member having a stepped part.

The multilayer adhesive tape may have both high step coverage and excellent reworkability by including a plurality of adhesive layers having different physical properties. In particular, when the difference in glass transition temperature between each of the first outer adhesive layer and the second outer adhesive layer and the intermediate adhesive layer satisfies 5° C. or more and 25° C. or less, the multilayer adhesive tape may exhibit the optimum performance.

The glass transition temperature of the intermediate adhesive layer may be −40° C. or more and 0° C. or less, −40° C. or more and −15° C. or less, −40° C. or more and −20° C. or less, or −35° C. or more and −25° C. or less. When the glass transition temperature of the intermediate adhesive layer satisfies the above range, the puchability of the multilayer adhesive tape may be improved, and the adhesive tape may be easily handled. Further, within the above glass transition temperature range, the multilayer adhesive tape may have more improved step coverage.

The glass transition temperature of each of the first outer adhesive layer and the second outer adhesive layer may be −60° C. or more and −20° C. or less, −60° C. or more and −30° C. or less, −60° C. or more and −40° C. or less, or −55° C. or more and −45° C. or less. When the glass transition temperature of each of the first outer adhesive layer and the second outer adhesive layer satisfies the above range, the multilayer adhesive tape may implement excellent step coverage. Furthermore, within the above glass transition temperature range, the deterioration in punchability of the multilayer adhesive tape may be minimized.

The intermediate adhesive layer may include an intermediate adhesive polymer including: a polymerization unit of an alkyl group-containing (meth)acrylate monomer; a polymerization unit of a cycloalkyl group-containing (meth)acrylate monomer; and a polymerization unit of a polar functional group-containing monomer.

In the intermediate adhesive layer, the content of the polymerization unit of the alkyl group-containing (meth)acrylate monomer may be 30 parts by weight or more and 90 parts by weight or less, 50 parts by weight or more and 85 parts by weight or less, or 60 parts by weight or more and 85 parts by weight or less, based on 100 parts by weight of the intermediate adhesive polymer.

Further, in the intermediate adhesive layer, the content of the polymerization unit of the cycloalkyl group-containing (meth)acrylate monomer may be more than 0 part by weight and 30 parts by weight or less, 5 parts by weight or more and 30 parts by weight or less, or 5 parts by weight or more and 15 parts by weight or less, based on 100 parts by weight of the intermediate adhesive polymer. In the intermediate adhesive layer, when the content of the polymerization unit of the cycloalkyl group-containing (meth)acrylate monomer is within the above range, the multilayer adhesive tape may have appropriate attaching force, and may appropriately cover a member having a stepped part. Further, within the above content range, the multilayer adhesive tape may have improved reworkability. Specifically, within the above content range, the multilayer adhesive tape may maintain appropriate strength and thus may be easily removed from an adherend when reconstruction is needed. Further, within the above content range, an intermediate adhesive composition may be easily applied and cured. Furthermore, within the above content range, it is possible to prevent delayed bubbles from being sharply increased in the intermediate adhesive layer.

In the intermediate adhesive layer, the content of the polymerization unit of the polar functional group-containing monomer may be more than 0 part by weight and 20 parts by weight or less, 5 parts by weight or more and 20 parts by weight or less, or 5 parts by weight or more and 15 parts by weight or less, based on 100 parts by weight of the intermediate adhesive polymer. In the intermediate adhesive layer, when the content of the polymerization unit of the polar functional group-containing monomer is within the above range, the multilayer adhesive tape may have both reworkability and step coverage at appropriate levels. Specifically, within the above content range, appropriate cohesive force of the intermediate adhesive layer may be secured, and accordingly, the multilayer adhesive tape may have both high reworkability and high step coverage. Furthermore, within the above content range, it is possible to effectively improve step coverage and die cutting performance of the multilayer adhesive tape and to suppress delayed bubbles generated after the multilayer adhesive tape is joined to an adherend and a predetermined time elapses.

The first outer adhesive layer and the second outer adhesive layer may each independently include an outer adhesive polymer including: a polymerization unit of an alkyl group-containing (meth)acrylate monomer; and a polymerization unit of a polar functional group-containing monomer.

In the outer adhesive layer, the content of the polymerization unit of the alkyl group-containing (meth)acrylate monomer may be 50 parts by weight or more and 98 parts by weight or less, 70 parts by weight or more and 98 parts by weight or less, 80 parts by weight or more and 95 parts by weight or less, or 90 parts by weight or more and 95 parts by weight or less, based on 100 parts by weight of the outer adhesive polymer.

In the outer adhesive layer, the content of the polymerization unit of the polar functional group-containing monomer may be more than 0 part by weight and 20 parts by weight or less, more than 0 part by weight and 10 parts by weight or less, 1 part by weight or more and 10 parts by weight or less, or 3 parts by weight or more and 7 parts by weight or less, based on 100 parts by weight of the outer adhesive polymer. In the outer adhesive layer, when the content of the polymerization unit of the polar functional group-containing monomer is within the above range, there is an advantage in that it is possible to implement both attaching force and step coverage of the multilayer adhesive tape at appropriate levels. Furthermore, within the above content range, it is possible to suppress delayed bubbles generated after the multilayer adhesive tape is joined to an adherend and then a predetermined time elapses. Further, within the above content range, the first outer adhesive layer and the second outer adhesive layer of the multilayer adhesive tape may implement appropriate adhesive force.

The outer adhesive polymer may further include a polymerization unit of a heterocycloalkyl group-containing (meth)acrylate monomer.

The heterocycloalkyl group may include a ring structure in which an unsaturated bond is not present and a heteroatom other than carbon is included in the functional group.

Furthermore, the heterocycloalkyl group may include a structure in which one or more carbon atoms are substituted with a heteroatom in a structure of a monocyclic ring or a polycyclic ring having 3 to 20 carbon atoms.

The heterocycloalkyl group-containing (meth)acrylate monomer may be one or more selected from the group consisting of tetrahydrofurfuryl acrylate (THFA), tetrahydrofurfuryl methacrylate, tetrahydropyranyl acrylate (THPA), acryloyl morpholine, and cyclictrimethylol-propaneformalacrylate (CTFA), but is not limited thereto.

The content of the polymerization unit of the heterocycloalkyl group-containing (meth)acrylate monomer may be 1 part by weight or more and 15 parts by weight or less, specifically, 5 parts by weight or more and 15 parts by weight or less, based on 100 parts by weight of the outer adhesive polymer.

The intermediate adhesive polymer may be formed by solution-polymerizing a composition including an alkyl group-containing (meth)acrylate monomer, a cycloalkyl group-containing (meth)acrylate monomer, and a polar functional group-containing monomer. Specifically, the intermediate adhesive polymer may be formed by polymerizing the monomers via the thermal polymerization and/or photopolymerization of the composition.

Further, each of the first outer adhesive polymer and the second outer adhesive polymer may be formed by solution-polymerizing a composition including an alkyl group-containing (meth)acrylate monomer and a polar functional group-containing monomer. Specifically, the first outer adhesive polymer and the second outer adhesive polymer may be formed by polymerizing the monomers via the thermal polymerization and/or photopolymerization of the composition.

Each of the intermediate adhesive polymer, the first outer adhesive polymer, and the second outer adhesive polymer may further include an additional material, such as a cross-linking agent, a polymerization initiator, and a tackifier, generally used in the art, if necessary.

In the present specification, the "(meth)acrylate" means "acrylate" or "methacrylate".

The cycloalkyl group may include a carbon ring structure in which an unsaturated bond is not present in a functional group. Furthermore, the cycloalkyl group may include a monocyclic ring or a polycyclic ring having 3 to 20 carbon atoms.

The alkyl group-containing (meth)acrylate monomer may be a (meth)acrylate having an alkyl group having 1 to 20 carbon atoms. Specifically, the alkyl group-containing (meth)acrylate monomer may be one or more selected from the group consisting of methyl (meth)acrylate, ethyl (meth)acrylate, isobornyl methyl (meth)acrylate, n-propyl (meth)acrylate, isopropyl (meth)acrylate, n-butyl (meth)acrylate, t-butyl (meth)acrylate, sec-butyl (meth) acrylate, pentyl (meth) acrylate, 2-ethylhexyl (meth) acrylate, 2-methylhexyl (meth) acrylate, 2-ethylbutyl (meth) acrylate, n-octyl (meth) acrylate, and isooctyl (meth)acrylate, but is not limited thereto.

The cycloalkyl group-containing (meth)acrylate monomer may be one or more selected from the group consisting of cyclohexyl acrylate (CHA), cyclohexyl methacrylate (CHMA), isobornyl acrylate (IBOA), isobornyl methacrylate (IBOMA), isobornyl methyl(meth)acrylate, and 3,3,5-trimethylcyclohexylacrylate (TMCHA), but is not limited thereto.

The polar functional group-containing monomer may include one or more monomers selected from the group consisting of a hydroxyl group-containing monomer, a carboxyl group-containing monomer, and a nitrogen-containing monomer.

The hydroxyl group-containing monomer may be one or more selected from the group consisting of 2-hydroxyethyl (meth)acrylate, 2-hydroxypropyl (meth)acrylate, 4-hydroxybutyl (meth)acrylate, 6-hydroxyhexyl (meth) acrylate, 8-hydroxyoctyl (meth) acrylate, 2-hydroxyethyleneglycol (meth) acrylate, and 2-hydroxypropyleneglycol (meth) acrylate, but is not limited thereto.

The carboxyl group-containing monomer may be one or more selected from the group consisting of acrylic acid, methacrylic acid, 2-carboxyethyl acrylic acid, 3-carboxypropyl acrylic acid, 2-(meth)acryloyloxy acetic acid, 3-(meth)acryloyloxy propyl acid, 4-(meth)acryloyloxy butyric acid, an acrylic acid dimer, itaconic acid, and maleic acid, but is not limited thereto.

The nitrogen-containing monomer may be one or more selected from the group consisting of 2-isocyanatoethyl (meth) acrylate, 3-isocyanatopropyl (meth) acrylate, 4-isocyanatobutyl (meth) acrylate, (meth) acrylamide, N-vinylpyrrolidone, dimethylacrylamide, and N-vinylcaprolactam, but is not limited thereto.

A thickness of the intermediate adhesive layer may be 30 μm or more and 100 μm or less, 50 μm or more and 100 μm or less, 50 μm or more and 80 μm or less, or 60 μm or more and 80 μm or less. When the thickness of the intermediate adhesive layer is within the above range, the multilayer adhesive tape has appropriate hardness and thus may implement excellent reworkability and step coverage.

A thickness of each of the first outer adhesive layer and the second outer adhesive layer may be 25 μm or more and 60 μm or less, specifically, 25 μm or more and 50 μm or less. When the thicknesses of the first outer adhesive layer and the second outer adhesive layer are within the above range, the multilayer adhesive tape may have excellent step coverage.

The total thickness of the multilayer adhesive tape may be 100 μm or more and 250 μm or less, specifically, 100 μm or more and 200 μm or less, or 120 μm or more and 170 μm or less. When the total thickness of the multilayer adhesive tape is within the above range, the multilayer adhesive tape may simultaneously have high adhesiveness, step absorbability, and reworkability in spite of a small thickness.

The first outer adhesive layer and the second outer adhesive layer may be formed by using a composition having the same composition. Furthermore, the thicknesses of the first outer adhesive layer and the second outer adhesive layer may be the same as each other.

Each of the thickness ratio of the first outer adhesive layer and the intermediate adhesive layer and the thickness ratio of the second outer adhesive layer and the intermediate adhesive layer may be 1:4 to 2:1, specifically, 1:0.7 to 1:2, or 1:0.7 to 1:1.5. When the thickness ratio of the intermediate adhesive layer to each of the first outer adhesive layer and the second outer adhesive layer is within the above range, the multilayer adhesive tape may have both excellent step coverage and excellent reworkability, and the die cutting performance may be excellent.

The multilayer adhesive tape may further include: a first interface mixture layer provided between the first outer adhesive layer and the intermediate adhesive layer; and a second interface mixture layer provided between the second outer adhesive layer and the intermediate adhesive layer. Specifically, the first interface mixture layer may include both a material constituting the first outer adhesive layer and a material constituting the intermediate adhesive layer. Furthermore, the second interface mixture layer may include both a material constituting the second outer adhesive layer and a material constituting the intermediate adhesive layer.

FIG. 2 is a schematic view of a lamination structure of a multilayer adhesive tape according to an exemplary embodiment. Specifically, FIG. 2 illustrates a multilayer adhesive tape in which a first interface mixture layer 301 is provided between the first outer adhesive layer 101 and the intermediate adhesive layer 201, and a second interface mixture layer 302 is provided between the intermediate adhesive layer 201 and the second outer adhesive layer 102.

The multilayer adhesive tape may be prepared by sequentially laminating a first outer adhesive composition, an intermediate adhesive composition, and a second outer adhesive composition, and then simultaneously curing, specifically, photocuring the compositions.

The first outer adhesive composition may constitute the first outer adhesive layer after curing, the intermediate adhesive composition may constitute the intermediate adhesive layer after curing, and the second outer adhesive composition may constitute the second outer adhesive layer after curing. Specifically, the multilayer adhesive tape may be prepared by a method of laminating liquid-phase compositions and then simultaneously curing the compositions, instead of a method of separately preparing the respective layers and then joining the layers. Accordingly, a liquid mixing section may occur among the respective layers constituting the multilayer adhesive tape. The multilayer adhesive tape may secure excellent interlayer attaching force by the liquid mixing section as compared to a general multilayer adhesive tape, and an interface separation phenomenon between layers may not occur even in an extremely low temperature environment.

An interface layer caused by liquid mixing may be present at each of the interface between the first outer adhesive composition and the intermediate adhesive composition and the interface between the intermediate adhesive composition and the second outer adhesive composition. Specifically, the interface layer caused by liquid mixing at the interface between the first outer adhesive composition and the intermediate adhesive composition may constitute the first interface mixture layer after curing. Further, the interface layer caused by liquid mixing at the interface between the intermediate adhesive composition and the second outer adhesive composition may constitute the second interface mixture layer after curing.

The first outer adhesive composition, the intermediate adhesive composition, and the second outer adhesive composition may be sequentially applied onto a substrate. In addition, the first outer adhesive composition, the intermediate adhesive composition, and the second outer adhesive composition may be simultaneously and sequentially applied onto a substrate. Furthermore, the adhesive composition may be applied by a method generally used in the art, such as slot-die and lip-die.

The thickness of the intermediate adhesive layer may be the shortest distance from the center of the first interface mixture layer to the center of the second interface mixture layer. In addition, the thickness of the first outer adhesive layer may be the shortest distance from the center of the first interface mixture layer to the outer side surface of the first outer adhesive layer. Furthermore, the thickness of the second outer adhesive layer may be the shortest distance from the center of the second interface mixture layer to the outer side surface of the second outer adhesive layer.

The multilayer adhesive tape may be prepared by curing each of the intermediate adhesive composition and the outer adhesive compositions in the form of a film, and then joining these films. Specifically, the multilayer adhesive tape may be prepared by separately preparing the first outer adhesive layer, the intermediate adhesive layer, and the second outer adhesive layer in the form of a film, sequentially laminating these films, and then compressing the resulting laminate. However, a preparation method of the multilayer adhesive tape is not limited to the preparation method, and the multilayer adhesive tape may be prepared by using a preparation method generally applied in the art.

The multilayer adhesive tape may be used for attaching various optical members such as a polarizing plate, a phase difference plate, an optical compensation film, a reflection sheet, a protection film, and a brightness-enhancing film. However, the use of the multilayer adhesive tape is not limited thereto, and the multilayer adhesive tape may be used without limitation for the use capable of being used in the art.

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to the person with ordinary skill in the art.

Example 1

Based on 100 parts by weight of a composition, an intermediate adhesive composition including 80 parts by weight of 2-ethylhexyl acrylate, 10 parts by weight of isobornyl methacrylate, and 10 parts by weight of acrylic acid was prepared.

Furthermore, based on 100 parts by weight of the composition, an outer adhesive composition including 94 parts by weight of 2-ethylhexyl acrylate and 6 parts by weight of acrylic acid was prepared.

The outer adhesive composition, the intermediate adhesive composition, and the outer adhesive composition were sequentially applied to a thickness of 45 μm, 60 μm, and 45 μm, respectively, and then simultaneously UV-cured through UV irradiation, thereby preparing a multilayer adhesive tape sequentially including a first outer adhesive layer, an intermediate adhesive layer, and a second outer adhesive layer.

In the multilayer adhesive tape according to Example 1, the glass transition temperature of the intermediate adhesive layer was about −30° C., and the glass transition temperature of each of the first and second outer adhesive layers was about −50° C.

Example 2

A multilayer adhesive tape was prepared in the same manner as in Example 1, except that acrylic acid of the outer adhesive composition was changed into 2-carboxyethyl acrylic acid.

In the multilayer adhesive tape according to Example 2, the glass transition temperature of the intermediate adhesive layer was about −30° C., and the glass transition temperature of each of the first and second outer adhesive layers was about −50° C.

Comparative Example 1

A multilayer adhesive tape was prepared in the same manner as in Example 1, except that the content of acrylic acid of the outer adhesive composition was adjusted to 1 part by weight.

In the multilayer adhesive tape according to Comparative Example 1, the glass transition temperature of the intermediate adhesive layer was about −30° C., and the glass transition temperature of each of the first and second outer adhesive layers was about −70° C.

Comparative Example 2

A multilayer adhesive tape was prepared in the same manner as in Example 1, except that the content of acrylic acid of the outer adhesive composition was adjusted to 15 parts by weight.

In the multilayer adhesive tape according to Comparative Example 2, the glass transition temperature of the intermediate adhesive layer was about −30° C., and the glass transition temperature of each of the first and second outer adhesive layers was about −10° C.

Comparative Example 3

A multilayer adhesive tape was prepared in the same manner as in Example 1, except that the content of isobornyl methacrylate of the intermediate adhesive composition was adjusted to 30 parts by weight, and the content of acrylic acid of the outer adhesive composition was adjusted to 2 parts by weight.

In the multilayer adhesive tape according to Comparative Example 3, the glass transition temperature of the intermediate adhesive layer was about 5° C., and the glass transition temperature of each of the first and second outer adhesive layers was about −60° C.

Comparative Example 4

A multilayer adhesive tape was prepared in the same manner as in Example 1, except that the content of isobornyl methacrylate of the intermediate adhesive composition was adjusted to 2 parts by weight.

In the multilayer adhesive tape according to Comparative Example 4, the glass transition temperature of the intermediate adhesive layer was about −50° C., and the glass transition temperature of each of the first and second outer adhesive layers was about −50° C.

Comparative Example 5

A multilayer adhesive tape was prepared in the same manner as in Example 1, except that the intermediate adhesive composition did not include isobornyl methacrylate, and the intermediate adhesive composition included 22 parts by weight of acrylic acid.

In the multilayer adhesive tape according to Comparative Example 5, the glass transition temperature of the intermediate adhesive layer was about −30° C., and the glass transition temperature of each of the first and second outer adhesive layers was about −50° C.

The compositions and the glass transition temperatures in the Examples and the Comparative Examples are summarized in the following Table 1.

TABLE 1

| | Intermediate adhesive layer | | | Outer adhesive layer | | |
|---|---|---|---|---|---|---|
| | Tg (° C.) | AA (parts by weight) | IBOMA (parts by weight) | Tg (° C.) | AA (parts by weight) | Difference in Tg |
| Example 1 | −30 | 10 | 10 | −50 | 6 | 20 |
| Example 2 | −30 | 10 | 10 | −50 | 6(B-CEA) | 20 |
| Comparative Example 1 | −30 | 10 | 10 | −70 | 1 | 40 |
| Comparative Example 2 | −30 | 10 | 10 | −10 | 15 | 20 |
| Comparative Example 3 | 5 | 10 | 30 | −60 | 2 | 65 |
| Comparative Example 4 | −50 | 10 | 2 | −50 | 6 | 0 |
| Comparative Example 5 | −30 | 22 | X | −50 | 6 | 20 |

* AA: Acrylic acid
* IBOMA: Isobornyl methacrylate
* B-CEA: 2-carboxyethyl acrylic acid Experimental Examples Physical properties of the multilayer adhesive tapes according to the Examples and the Comparative Examples were evaluated, and are shown in the following Table 2.

Evaluation of Reworkability

When the prepared multilayer adhesive tape was attached onto a glass substrate, the substrate was left to stand for 20 minutes in an autoclave under conditions of 40° C. and 4 bar, and then the multilayer adhesive tape was removed, the case where the multilayer adhesive tape was completely removed at a time without being cut off, the case where the multilayer adhesive tape was cut off, but the removing work was needed five times or less, the case where the multilayer adhesive tape was easily cut off, so that the removing work was needed six times or more, and the case where the multilayer adhesive tape was easily cut off and the removing work was impossible were evaluated as "⊚", "◯", "Δ", and "X", respectively.

Evaluation of Step Coverage

The prepared multilayer adhesive tape was attached onto a glass substrate having a bezel part having a printing step of 20 μm and a screen part having no printing step, and a glass substrate having a thickness of 0.55 T was laminated thereon. Moreover, after the resulting laminate was left to stand for 20 minutes in an autoclave under conditions of 40° C. and 4 bar, the step coverage was evaluated by confirming the number of bubbles produced as a result of the failure to sufficiently overcome the step at four vertex portions of the bezel part and delayed bubbles at the screening part after 24 hours elapsed. Specifically, the case where the number of the delayed bubbles was 2 or less and no delayed bubbles occurred, the case where the number of the delayed bubbles was 2 to 3 and the delayed bubbles were slightly generated, the case where the number of the delayed bubbles was 3 to 4 and the delayed bubbles were prominently generated, and the case where the number of the delayed bubbles was 4 or more and the delayed bubbles were prominently generated were evaluated as "⊚", "◯", "Δ", and "X", respectively.

Evaluation of Die Cutting Performance

The die cutting performance was evaluated by measuring whether residue occurred, the degree of reduction in yield of the die cutting process due to the residue stuck on a bladed portion and a die cutting portion, and the like when the prepared multilayer adhesive tape was punched by using a Thomson die cutting machine. Specifically, the case where the tape was punched without any occurrence of residue, the yield of the die cutting process was 95% or more, and the adhesive agent did not flow onto the punched surface one week after the die cutting, the case where the tape was punched without any occurrence of residue, the yield of the die cutting process was 80% or more and less than 95%, and the adhesive agent did not flow onto the punched surface one week after the die cutting, the case where the tape was punched without any occurrence of residue, the yield of the die cutting process was 50% or more and less than 80%, and the adhesive agent flowed onto the punched surface one week after the die cutting, and the case where the tape was punched without any occurrence of residue, the yield of the die cutting process is less than 50%, and the adhesive agent flowed onto the punched surface one week after the die cutting were evaluated as "◎", "○", "Δ", and "X", respectively.

TABLE 2

|  | Reworkability | Step coverage | Die cutting performance |
|---|---|---|---|
| Example 1 | ○ | ○ | ○ |
| Example 2 | ○ | ◎ | ○ |
| Comparative Example 1 | X | ◎ | X |
| Comparative Example 2 | ○ | X | ○ |
| Comparative Example 3 | ◎ | Δ | ◎ |
| Comparative Example 4 | X | ○ | Δ |
| Comparative Example 5 | Δ | ○ | ○ |

According to Table 2, it can be seen that in Comparative Example 1, the reworkability and die cutting performance are very poor because the difference in glass transition temperature between the intermediate adhesive layer and the outer adhesive layer is significantly large. Furthermore, it can be seen that in Comparative Example 2, the step coverage is poor because the content of acrylic acid in the outer adhesive layer is extremely high. Further, it can be seen that in Comparative Example 3, the step coverage is poor because the glass transition temperature of the intermediate adhesive layer is extremely high and the difference in glass transition temperature between the intermediate adhesive layer and the outer adhesive layer is extremely large. In addition, it can be seen that in Comparative Example 4, the reworkability and die cutting performance are poor because the glass transition temperature of the intermediate adhesive layer is extremely low. Furthermore, it can be seen that in Comparative Example 5, the reworkability is poor because the hardness of the intermediate adhesive layer is not secured by including no cycloalkyl group-containing (meth)acrylate monomer.

EXPLANATION OF REFERENCE NUMERALS AND SYMBOLS

101: First outer adhesive layer
102: Second outer adhesive layer
201: Intermediate adhesive layer
301: First interface mixture layer
302: Second interface mixture layer

The invention claimed is:

1. A multilayer adhesive tape sequentially comprising:
a first outer adhesive layer;
an intermediate adhesive layer; and
a second outer adhesive layer,
wherein a glass transition temperature of the intermediate adhesive layer is −40° C. or more and 0° C. or less,
a glass transition temperature of each of the first outer adhesive layer and the second outer adhesive layer is −60° C. or more and −20° C. or less, and
a difference between the glass transition temperature of each of the first outer adhesive layer and the second outer adhesive layer and the glass transition temperature of the intermediate adhesive layer is 5° C. or more and 25° C. or less,
wherein the intermediate adhesive layer comprises an intermediate adhesive polymer comprising: a polymerization unit of an alkyl group-containing (meth)acrylate monomer; a polymerization unit of a cycloalkyl group-containing (meth)acrylate monomer; and a polymerization unit of a polar functional group-containing monomer,
wherein a content of the polymerization unit of the cycloalkyl group-containing (meth)acrylate monomer is from 5 part by weight to 15 parts by weight based on 100 parts by weight of the intermediate adhesive polymer,
wherein the first outer adhesive layer and the second outer adhesive layer each independently comprise an outer adhesive polymer comprising: a polymerization unit of an alkyl group-containing (meth)acrylate monomer; and a polymerization unit of a polar functional group-containing monomer,
wherein a content of the polymerization unit of the polar functional group-containing monomer is from more than 0 part by weight to 10 parts by weight or less based on 100 parts by weight of the outer adhesive polymer.

2. The multilayer adhesive tape of claim 1, wherein a content of the polymerization unit of the polar functional group-containing monomer is more than 0 part by weight and 20 parts by weight or less based on 100 parts by weight of the intermediate adhesive polymer.

3. The multilayer adhesive tape of claim 1, wherein a thickness of the intermediate adhesive layer is 30 μm or more and 100 μm or less.

4. The multilayer adhesive tape of claim 1, wherein a thickness of each of the first outer adhesive layer and the second outer adhesive layer is 25 μm or more and 60 μm or less.

5. The multilayer adhesive tape of claim 1, wherein a thickness ratio of the first outer adhesive layer to the intermediate adhesive layer and a thickness ratio of the second outer adhesive layer to the intermediate adhesive layer are each 1:4 to 2:1.

6. The multilayer adhesive tape of claim 1, further comprising: a first interface mixture layer provided between the first outer adhesive layer and the intermediate adhesive layer; and a second interface mixture layer provided between the second outer adhesive layer and the intermediate adhesive layer.

7. The multilayer adhesive tape of claim 1, wherein the outer adhesive polymer further comprises a polymerization unit of a heterocycloalkyl group-containing (meth)acrylate monomer.

8. The multilayer adhesive tape of claim 7, wherein the heterocycloalkyl group-containing (meth)acrylate monomer is one or more selected from the group consisting of tetrahydrofurfuryl acrylate (THFA), tetrahydrofurfuryl methacrylate, tetrahydropyranyl acrylate (THPA), acryloyl morpholine, and cyclictrimethylol-propaneformalacrylate (CTFA).

9. The multilayer adhesive layer of claim 7, wherein a content of the polymerization unit of the heterocycloalkyl group-containing (meth)acrylate monomer is 1 part by weight or more and 15 parts by weight or less based on 100 parts by weight of the outer adhesive polymer.

10. The multilayer adhesive tape of claim 1, wherein the alkyl group-containing (meth)acrylate monomer is one or more selected from the group consisting of methyl (meth)acrylate, ethyl (meth)acrylate, isobornyl methyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-methylhexyl (meth)acrylate, 2-ethylbutyl (meth)acrylate, n-octyl (meth)acrylate, and isooctyl (meth)acrylate.

11. The multilayer adhesive tape of claim 1, wherein the cycloalkyl group-containing (meth)acrylate monomer is or more selected from the group consisting of cyclohexyl acrylate (CHA), cyclohexyl methacrylate (CHMA), isobornyl acrylate (IBOA), isobornyl methacrylate (IBOMA), isobornyl methyl(meth)acrylate, and 3,3,5-trimethylcyclohexylacrylate (TMCHA).

12. The multilayer adhesive tape of claim 1, wherein the polar functional group-containing monomer is one or more monomers selected from the group consisting of a hydroxyl group-containing monomer, a carboxyl group-containing monomer, and a nitrogen-containing monomer.

13. The multilayer adhesive tape of claim 12, wherein the hydroxyl group-containing monomer is one or more selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, and 2-hydroxypropyleneglycol (meth)acrylate.

14. The multilayer adhesive tape of claim 12, wherein the carboxyl group-containing monomer is selected from the group consisting of acrylic acid, methacrylic acid, 2-carboxyethyl acrylic acid, 3-carboxypropyl acrylic acid, 2-(meth)acryloyloxy acetic acid, 3-(meth)acryloyloxy propyl acid, 4-(meth)acryloyloxy butyric acid, an acrylic acid dimer, itaconic acid, and maleic acid.

15. The multilayer adhesive tape of claim 12, wherein the nitrogen-containing monomer is one or more selected from the group consisting of 2-isocyanatoethyl (meth)acrylate, 3-isocyanatopropyl (meth)acrylate, 4-isocyanatobutyl (meth)acrylate, (meth)acrylamide, N-vinylpyrrolidone, dimethylacrylamide, and N-vinylcaprolactam.

* * * * *